United States Patent [19]
Bernal

[11] Patent Number: 5,921,277
[45] Date of Patent: Jul. 13, 1999

[54] AIR DUCT DAMPER

[76] Inventor: Richard G. Bernal, P. O. Box 374, Summerland, Calif. 93067

[21] Appl. No.: 08/834,324

[22] Filed: Apr. 24, 1997

[51] Int. Cl.⁶ .................................. F16K 37/00; F24F 7/00
[52] U.S. Cl. ...................... 137/556.3; 137/315; 137/552; 137/559; 251/305; 454/333
[58] Field of Search .................................. 137/315, 552, 137/556.3, 559; 251/305; 454/333

[56] References Cited

U.S. PATENT DOCUMENTS

| | | | |
|---|---|---|---|
| 1,422,868 | 7/1922 | Kasch et al. ........................ | 454/333 X |
| 1,517,335 | 12/1924 | Zinis ................................... | 251/305 X |
| 2,702,504 | 2/1955 | Guildford ............................. | 454/333 |
| 2,765,726 | 10/1956 | Powers ................................. | 454/266 |
| 2,835,467 | 5/1958 | Guildford ............................. | 454/333 X |
| 2,862,685 | 12/1958 | Lundberg ............................. | 251/305 |
| 3,070,346 | 12/1962 | Kennedy ............................... | 251/266 |
| 3,295,821 | 1/1967 | McQuown ............................. | 251/305 |
| 3,457,849 | 7/1969 | Hinden ................................. | 454/333 |
| 4,024,890 | 5/1977 | Yasuoka ............................... | 137/556.3 |
| 4,688,472 | 8/1987 | Inglis .................................... | 454/333 |
| 4,691,689 | 9/1987 | Shepherd et al. .................... | 126/295 |
| 4,715,581 | 12/1987 | Myers ................................... | 251/305 X |
| 5,370,360 | 12/1994 | Buckley ................................ | 251/305 |
| 5,788,218 | 8/1998 | Goldman ............................... | 251/305 X |

*Primary Examiner*—John Rivell
*Attorney, Agent, or Firm*—Gene Scott-Patent Law & Venture Group

[57] ABSTRACT

A damper device for use with an air duct provides a paddle positioned within the air duct and an axle extending to one side of the paddle, through the duct wall and insulation to a position for manual adjustment of the position of the paddle within the duct. A bushing holds the axle in place, the bushing being tightened against the wall of the duct by a hand nut. The hand nut provides a brightly colored flag that is extendable when the damper device is in place. An O-ring is used to cause a frictional relationship between the paddle axle and the bushing so that the paddle is fixed into place once adjusted. A contour step on the bushing face allows engagement between the paddle and the bushing so as to hold the bushing from rotating while the hand nut is threaded into place on the bushing.

12 Claims, 3 Drawing Sheets

AIR DUCT DAMPER

BACKGROUND OF THE INVENTION

1. Field of the Invention

This invention relates generally to duct dampers, and more particularly to an air duct damper providing cantilevered construction, ease of installation, and features for improving the ability to locate the damper adjustment control.

2. Description of Related Art

The following art defines the present state of this field:

Guildford, U.S. Pat. No. 2,702,504 describes an air duct control means that provides a damper regulating means which is ordinarily inaccessible to tampering by persons who are not authorized or qualified to make changes in damper adjustments.

Powers, U.S. Pat. No. 2,765,726 describes a means for re-circulating heating air. The invention provides for using the draft of the incoming hot air to cause a continued re-circulation of the air in the room thereby preventing the stratification so common in which the lower areas are cold and the ceiling areas are hot. This stratification produces the effect of coolness or chilliness to be felt by the occupant of the room.

Kennedy, U.S. Pat. No. 3,070,346 describes a flow control damper which is simpler and less costly in construction. This invention is adaptable to a wider range of duct sizes without alteration and is adjustable from an operating point within the duct, and is quieter in operation and more effective in sealing the duct fully closed.

Inglis, U.S. Pat. No. 4,688,472 describes a spoiler that is located on the damper blade of a damper assembly such that it serves to divert the flow from the hinge area to avoid air separation. Further, the spoiler does not define the most restricted portion of the flow path and thereby has a minimal effect on the flow resistance.

Shepherd et al., U.S. Pat. No. 4,691,689 describes an adjustable damper having a tubular duct section defining first and second diametrically opposed openings and first and second sets of detents formed radially from the material of the duct about the respective openings to define a plurality of damper settings.

The prior art teaches air dampers. However, the prior art does not teach that an air damper may be supported from one side of the duct only, and may have a simple installation without tools, and may have flag storage and displaying capability for use by workmen. The present invention fulfills these needs and provides further related advantages as described in the following summary.

SUMMARY OF THE INVENTION

The present invention teaches certain benefits in construction and use, which give rise to the objectives described below.

A damper device for use with an air duct provides a paddle positioned within the air duct and an axle extending to one side of the paddle, through the duct wall and insulation to a position for manual adjustment of the position of the paddle within the duct. A bushing holds the axle in place, the bushing being tightened against the wall of the duct by a hand nut. The hand nut provides a brightly colored flag that is extendable when the damper device is in place. An O-ring is used to cause a frictional relationship between the paddle axle and the bushing so that the paddle is fixed into place once adjusted. A contour step on the bushing face allows engagement between the paddle and the bushing so as to hold the bushing from rotating while the hand nut is threaded into place on the bushing.

A primary objective of the present invention is to provide an air duct damper that has advantages in installation and use not taught by the prior art.

A more specific objective is to provide such an air duct damper that is convenient to install from one side of the duct rather than requiring access to both sides of the duct.

A further objective is to provide such an air duct damper that is able to be seen in dim light and not easily covered-up by duct insulation.

A still further objective is to provide such an air duct damper that is adjustable without removing or disturbing the duct insulation.

An important further objective is to provide such an air duct damper that can be mounted in an air duct and tightened in place, without using any tools.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
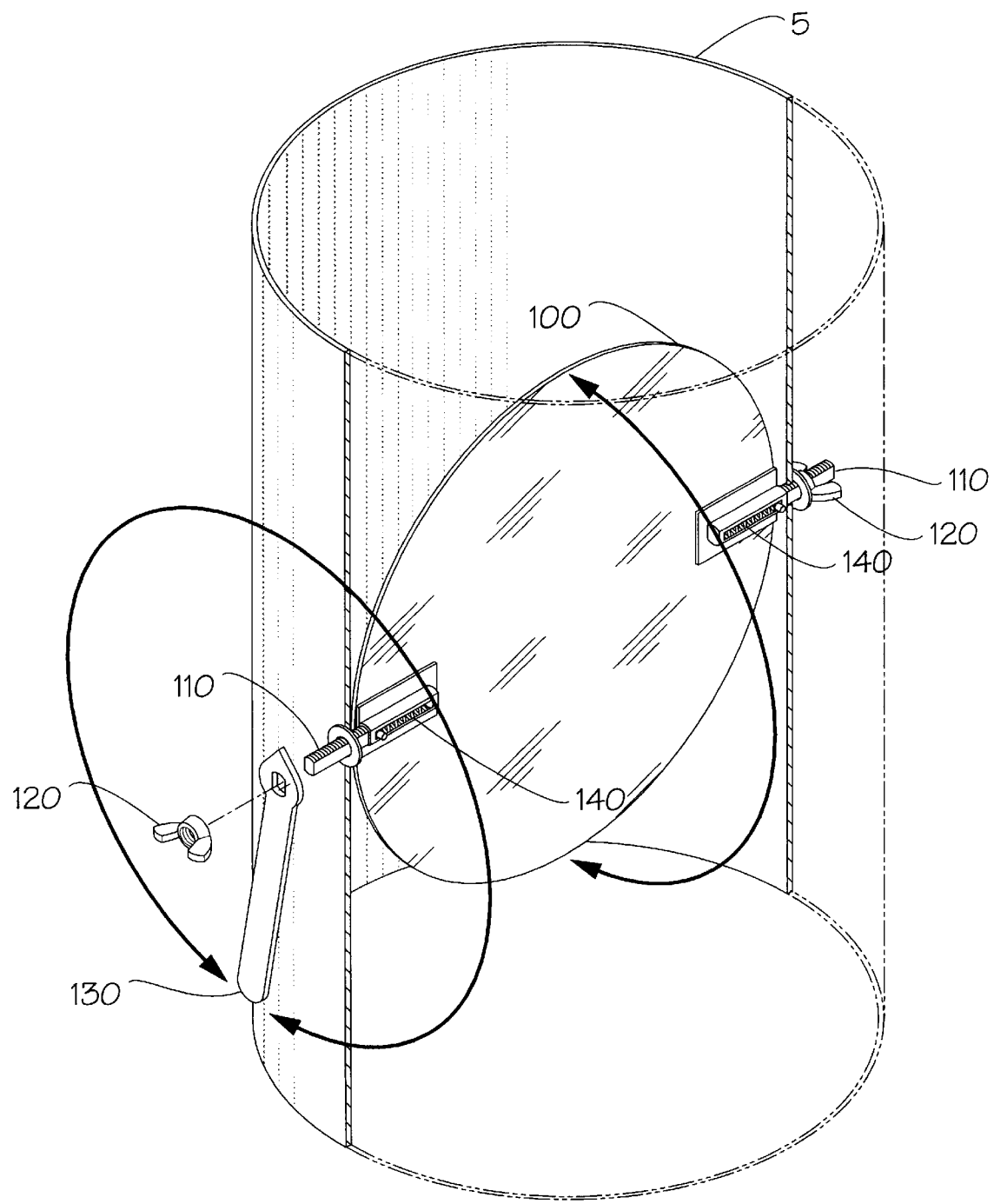
FIG. 1 is a perspective exploded view of the prior art showing an air duct with a proximal portion removed so as to show interior details.

The above-described drawing figures illustrate the invention, a damper device for use with an air duct 5 and other types of fluid flow conduits. As seen in FIG. 1, the prior art device, which is used extensively in the heating, ventilation and air conditioning industry, provides a disk-shaped control surface or paddle 100, supported on opposing sides by a threaded stud 110 which penetrates the duct 5 and is held in place by wing nuts 120. A handle 130 is mounted on each of the threaded studs 110 in order to facilitate angular positioning of the paddle 100, the handle 130 also indicating, by virtue of its orientation, the orientation, as well, of the paddle 100 within the duct 5. It is important to notice that, in order to mount the prior art damper device in this prior art scheme, it is necessary to have physical access to both sides of the duct 5, something not always available and highly dependent upon details of the construction site. Further, it is clear that the 4 to 6 inches of insulating material that is normally placed around such ducts 5 completely covers the handle 130 so that it normally is difficult for air conditioning service personnel to find the locations of the handles 130 in order to adjust air volume flows within such duct systems. The prior art device also requires a complex construction with springs 140 loading the studs 110, enabling the studs 110 to be retracted during installation of the paddle 100. This approach is, of course, expensive in both parts production and required labor.

Figure 2:
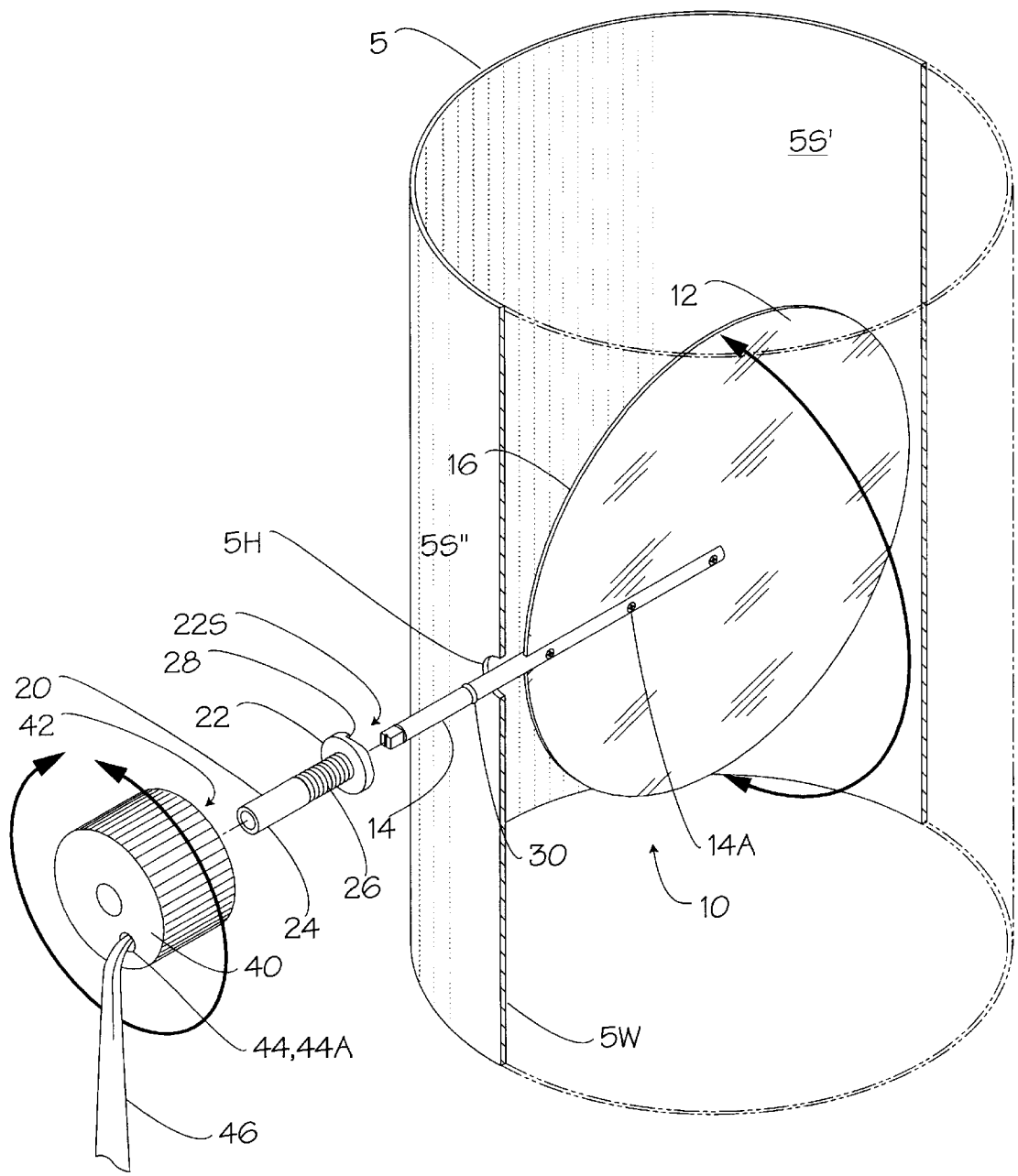
FIG. 2 is a perspective exploded view of the present invention with the air duct shown as in FIG. 1.
Figure 3:
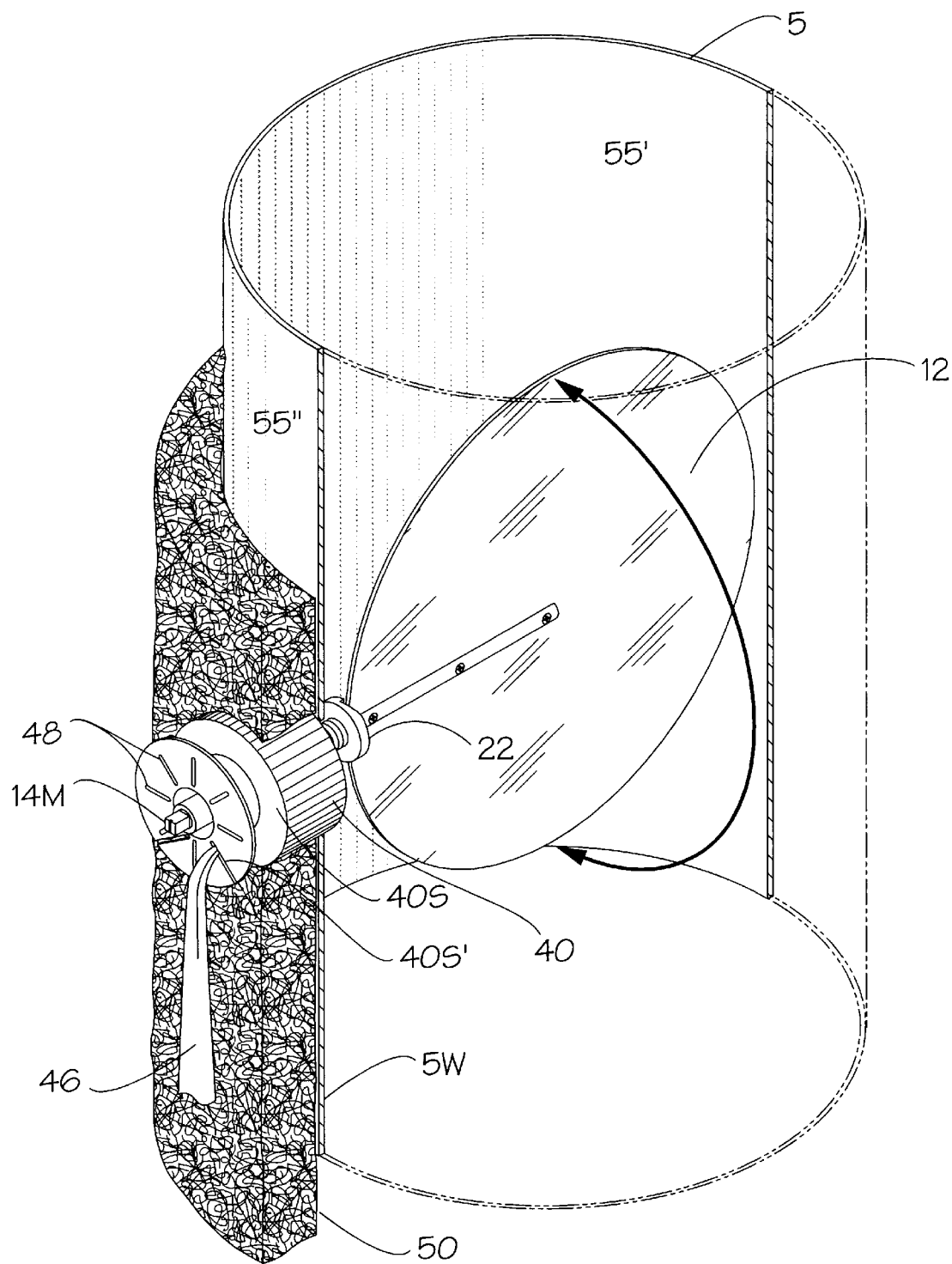
FIG. 3 is a perspective view of an alternate embodiment of the present invention with the air duct shown as in FIG. 1 and showing the placement of duct insulation.

The present invention is a combination of a damper device with the air duct 5. The damper device comprises a damper means 10 made up of a damper paddle means 12 and a paddle axle means 14. The paddle axle means 14 is engaged with the damper paddle means 12, as for instance, by the screws 14A, and extends to one side of it so that with the damper paddle means 12 positioned within the air duct 5, the paddle axle means 14 extends through a mounting hole 5H in the air duct 5 for access to the paddle axle means 14 from outside the air duct 5. A tubular bushing 20 provides a bushing head 22 at one end and a bushing body 24. The bushing body 24 preferably provides an external thread means 26, which may be a machine thread and may cover a part or all of the bushing body 24. The bushing head 22 is positioned against an inner surface 5S' of the air duct and the bushing body 24 is coaxially engaged with the paddle axle means 14 and extends from the mounting hole 5H as seen in FIG. 2. The device further includes a means for frictionally engaging 30, such as one or more of the rubber O-ring shown, of the bushing body 24 with the paddle axle means 14. The O-ring is preferably sized so as to make it impossible for an air stream alone, typical of common installations, to force the damper means 10 to be repositioned. The device also includes a knob means 40 threadably engaged on the bushing body 24 and threadably movable on it along thread means 26 for tightly sandwiching the air duct wall 5W between the bushing head 22 and an end surface 42 of the knob means 40, as best seen in FIG. 3. To accomplish this, the knob means 40 is positioned adjacent to the bushing head 22 and is drawn into contact with an outer surface 5S" of the air duct 5 for tightening the bushing 20 onto it. The paddle axle means 14 extends beyond the bushing body 24. It provides a means for grasping the paddle axle means 14, as with a wrench or pliers, for rotation of the paddle means 12 from outside the air duct 5 for adjusting the position of the paddle means 12 within the air duct 5.

The bushing head 22 provides a bushing head surface 22S directed toward the paddle means 12. The bushing head surface 22S provides a means for paddle edge engagement 28, for engaging a peripheral edge 16 of the paddle means 12. With the peripheral edge 16 of the paddle means 12 manually placed into contact with the engagement means 28, the bushing 20 is prevented from turning, thus allowing knob means 40 to be tightened onto bushing means 20 without the latter turning. After tightening, the paddle means 12 is moved laterally out of contact with the means for paddle edge engagement 28 so that the paddle means 12 is free to rotate within bushing 20. Preferably, the means for paddle edge engagement 28 is a step in a contour of the bushing head surface 22S.

The knob means 40 provides a storage space 44 within the knob means 40. A flag means 46 is stored within the storage space 44. The flag means 46 is extendable from an aperture 44A in the knob means 40 so as to be positionable for viewing the flag means 46 from outside the air duct 5, even when the duct 5 is covered with a layer of insulation. The aperture 44A acts as a retaining means for holding the flag means 46 in a position of visibility.

In the embodiment, shown in FIG. 3, the knob means 40 further includes an angle related marking means 48. The paddle axle means 14 further includes an orientation indication means 14M which cooperates with the angle related marking means 48 to identify the approximate angular position of the paddle means 12 within the air duct 5. This is accomplished because the indication means 14M is preferably a slot or line, which is aligned with the orientation of the paddle's peripheral edge 16. In the alternate embodiment, the flag means 46 is wound around a spool 40S for storage and when unfurled for use is inserted into a slot 40S' in the spool 40S so as to be secured for viewing.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A damper device for use with an air duct, the device comprising:

a damper means providing a damper paddle means and a paddle axle means engaged with the damper paddle means and extending to one side of the damper paddle means so that with the damper paddle means positioned within the air duct, the paddle axle means extends through a mounting hole in the air duct for access to the paddle axle means from outside of the air duct;

a tubular bushing providing a bushing head at one end thereof and a bushing body, the bushing body providing an external thread means thereon, the bushing head being positioned against an inner surface of the air duct, the bushing body coaxially engaged with the paddle axle means and extending from the mounting hole;

a means for frictionally engaging the bushing body with the paddle axle means;

a knob means threadably engaged on the bushing body and movable thereon for sandwiching the air duct between the bushing head and an end surface of the knob means adjacent to the bushing head and drawn into contact with an outer surface of the air duct for tightening the bushing onto the air duct;

the paddle axle means extending beyond the bushing body and providing a means for grasping the paddle axle means for rotation of the paddle means from outside the air duct for adjusting the position of the paddle means within the air duct.

2. The device of claim 1 wherein the bushing head provides a bushing head surface directed toward the paddle means, the bushing head surface providing a means for paddle edge engagement for engaging a peripheral edge of the paddle for manually holding the bushing during engagement of the knob means.

3. The device of claim 2 wherein the means for paddle engagement is a step in a contour of the bushing head surface.

4. The device of claim 1 wherein the knob means provides a storage space within the knob means, and a flag means stored within the storage space, the flag means being extendable from an aperture in the knob means so as to be positionable for viewing the flag means from outside the air duct.

5. The device of claim 4 wherein the knob means further includes a flag retaining means for holding the flag in a position of visibility.

6. The device of claim 1 wherein the knob means further includes a angle related marking means, and the paddle axle means further includes an orientation indication means, the orientation indication means and the angle related marking means cooperating, as the paddle axle means is rotated to identify the approximate angular position of the paddle means within the air duct.

7. A device combining an air duct and air duct damper comprising:

an air duct providing a damper mounting hole in a sidewall of the air duct;

a damper means providing a damper paddle means and a paddle axle means engaged with the damper paddle means and extending to one side of the damper paddle means so that with the damper paddle means positioned within the air duct, the paddle axle means extends through the damper mounting hole in the sidewall of the air duct for access to the paddle axle means from outside of the air duct;

a tubular bushing providing a bushing head at one end thereof and a bushing body, the bushing body providing an external thread means thereon, the bushing head being positioned against an inner surface of the air duct, the bushing body coaxially engaged with the paddle axle means and extending from the mounting hole;

a means for frictionally engaging the bushing body with the paddle axle means;

a knob means threadably engaged on the bushing body and movable thereon for sandwiching the air duct between the bushing head and a surface of the knob means adjacent to the bushing head and drawn into contact with an outer surface of the air duct for tightening the bushing onto the air duct;

the paddle axle means extending beyond the bushing body and providing a means for grasping the paddle axle means for rotation of the paddle means from outside the air duct for adjusting the position of the paddle means within the air duct.

8. The device of claim 7 wherein the bushing head provides a bushing head surface directed toward the paddle means, the bushing head surface providing a means for paddle edge engagement for engaging a peripheral edge of the paddle for manually holding the bushing during engagement of the knob means.

9. The device of claim 8 wherein the means for paddle engagement is a step in a contour of the bushing head surface.

10. The device of claim 7 wherein the knob means provides a storage space within the knob means, and a flag means stored within the storage space, the flag means being extendable from an aperture in the knob means so as to be positionable for viewing the flag means from outside the air duct.

11. The device of claim 10 wherein the knob means further includes a flag retaining means for holding the flag in a position of visibility.

12. The device of claim 7 wherein the knob means further includes a angle related marking means, and the paddle axle means further includes an orientation indication means, the orientation indication means and the angle related marking means cooperating, as the paddle axle means is rotated to identify the approximate angular position of the paddle means within the air duct.

* * * * *